Patented July 20, 1943

2,324,951

UNITED STATES PATENT OFFICE 2,324,951

FOAM STABILIZING COMPOSITION

Arthur Ferdinand Ratzer, Hanworth, England, assignor to Pyrene Minimax Corporation, Newark, N. J., a corporation of Delaware No Drawing. Application May 26, 1939, Serial No. 275,802. In Great Britain May 31, 1938

10 Claims. (Cl. 252—307)

This invention relates to foam stabilizing substances capable of forming stable foams with water and a gas, the method of preparing such substances, and the method of forming fire extinguishing foam with such substances.

Numerous proteinaceous materials including degradation products of proteins have been used or suggested for the production of foam for various purposes. For example, in the fire extinguishing art, glues and casein products have been recommended and used. These materials, however, do not fully satisfy the present requirements of a foam stabilizing agent which requirements are becoming more and more exacting for the manufacture of fire extinguishing foam, particularly the making of air foam utilizing a stream of water to aspirate air in the foam production.

An object of this invention is to provide a foam stabilizing material which is readily soluble in water and produces a high yield of very stable foam.

Another object is the adaptation of a product resulting from a controlled hydrolysis of proteins as a foam stabilizing material in the production of fire extinguishing foam.

Further objects and advantages of this invention will be apparent and will be explained in connection with the following description.

It has been discovered that foam stabilizing substances can be produced having foam producing properties of a surprisingly high order and yielding foams of high stability by subjecting animal or other protein to a controlled hydrolysis. Particularly suitable proteinaceous materials for this purpose are proteins consisting principally of keratins, albumens, globulins or hemoglobins (which are sometimes regarded as globulins) or more than one of these. One or other of these proteins is found in substantial quantities in horns, hoofs, hair, feathers, blood, soya bean meal, pea flour and maize meal, and these natural materials are suitable for producing the foam stabilizing materials of this invention. The controlled hydrolysis of the protein is preferably carried to a point such that at least 25% of the nitrogen present in the water-soluble products of the hydrolysis is present in the form of peptones. As the hydrolysis proceeds, the proportion of nitrogen in the form of peptones increases until a maximum is reached, and if the hydrolysis is continued further, the peptones then break down to form lower amino acids and the proportion of nitrogen in the form of peptones decreases. The hydrolysis or degradation is preferably carried out to produce as high a proportion of nitrogen in the form of peptones as possible and such a proportion is preferably carried at least as high as 50%, although in practice it is difficult, if not impossible, for the proportion of the nitrogen in the form of peptones to exceed 60%. By the nitrogen present in the form of peptones is meant that amount of the total nitrogen present that can be determined as follows: An aqueous dilute solution of the products is saturated with magnesium sulphate in the presence of 0.3% of sulphuric acid calculated on the total weight of the saturated solution, and the precipitate is removed. The nitrogen in the remaining solution that does not react as amino acids in Sorenson's formaldehyde titration method of determining amino acids is regarded as the nitrogen present in the water-soluble products in the form of peptones, and its percentage can be calculated after determining the total nitrogen in the water-soluble products.

Very good results are obtained when there is employed as hydrolysing agent an oxide of an alkaline earth metal or magnesium oxide. The hydrolysing agent preferably employed is calcium oxide, i. e., lime, but barium oxide and strontium oxide are also suitable. Magnesium oxide can be used, but the results are not quite so good, probably on account of its low solubility. Of course, in the reaction the oxides will invariably form the hydroxides, and it is probably in this form that they will react with the protein. Indeed, the oxides can be introduced as hydroxides. Hence it is to be understood that where in the claims a reference is made to the oxides, the hydroxides are included also.

It has been found that if the hydrolysis or degradation of the proteins is controlled and not allowed to proceed too far, the point is reached at which a neutral 1% aqueous solution of the water-soluble hydrolysis products yields in apparatus for producing fire-extinguishing air foam a foam having a volume at least six times that of the solution.

If desired, there may be added to such hydrolysis products a further foam stabilizing substance for the purpose of increasing the stability or lasting power of the foam produced. Thus there may be incorporated in an aqueous solution of the water-soluble products of the hydrolysis a salt which on dilution of the solution or on formation of the foam is hydrolyzed to an insoluble hydroxide. Among such substances are ferrous and ferric salts (in either case ferric hydroxide is the insoluble hydroxide)

and ferrous sulphate is especially suitable. It should be added that if a strongly acid salt is used the acidity of the solution may need to be modified in order to avoid precipitation of nitrogenous substances when the salt is added. The addition of such further stabilizing materials is not necessary, however, since the hydrolysis products themselves are capable of producing a foam with a high stability.

The protein to be hydrolyzed may conveniently be horn or hoof meal, dried blood or mixtures of these materials. Other starting materials are pea flour, maize flour and soya bean meal (i. e., the material left when the oil has been extracted from soya beans). If pea flour or maize meal is used, the starch should first be extracted, as otherwise it would interfere with the hydrolysis.

The hydrolysis can be carried out by heating the proteinous material with the oxide and water at atmospheric or other pressure, and it is of advantage to introduce a salt in addition to the hydrolyzing agent. Especially when lime is being used a soluble calcium salt, for instance calcium chloride, is preferable, and when lime is used it is sufficient to add a little hydrochloric acid, which is neutralized with formation of the chloride. However, sodium chloride and other salts are also suitable. If lime is employed as a hydrolyzing agent in conjunction with calcium chloride, the proteinaceous material, lime and calcium chloride are preferably boiled with water at atmospheric pressure for a sufficient time to produce the desired degree of hydrolysis.

A particularly convenient method of continuing the process is to neutralize the boiled product with an acid such as 20% sulfuric acid, boil the neutralized product carefully to expel undesirable gases, add a calculated quantity of sodium sulfate to convert the calcium present in solution to calcium sulfate, leaving a sodium salt, and then filter and wash the residue. The filtrate and washings are then combined and concentrated by evaporation until a liquid containing about 50% by weight of solids is obtained. The liquid is a stable foam stabilizing material and particularly useful for the production of air foam for fire extinguishing purposes. If desired, the evaporation may be continued to complete dryness and the resulting solid substance used as the foam stabilizing material.

For a more complete understanding of the invention, the following examples of preparing protein hydrolysis products are given:

Example 1.—100 lbs. of horn and hoof meal, 20 lbs. of slaked lime and 6 lbs. of calcium chloride are boiled with about 300 lbs. of water at atmospheric pressure for a period of about four hours with continuous agitation. The product is then neutralized with 20% sulfuric acid, boiled for a period of about 30 minutes to expel undesirable gases, and further treated and concentrated as described earlier in this specification.

If desired a somewhat larger or smaller quantity of slaked lime may be employed, but in practice the amount of slaked lime should not be less than 10 lbs. when the other quantities are as indicated above. If less than 20 lbs. is employed it is advisable to increase the time of heating, heat at an increased temperature under pressure (for instance in an autoclave) or both. The quantity of calcium chloride may vary, but in practice not less than three lbs. should be employed.

In this example, instead of boiling the mixture for four hours it may be heated for 8 hours at 90° C. with continuous agitation.

Example II.—Dried blood or soya bean meal is treated in a similar manner to the horn and hoof meal of Example 1, the quantities of reagents being the same.

The foregoing conditions are quite generally applicable to the preparation of protein hydrolysis products from various proteinaceous materials. However, in order to obtain the exact degree of hydrolysis defined, the conditions must be rigidly controlled. With different samples of horn and hoof meal, dried blood or soya bean meal, there may be some variation in composition and in such cases it will be necessary to alter slightly the conditions given in the foregoing examples.

The protein hydrolysis products are particularly useful for producing air foam for fire extinguishing purposes, and for this purpose may be added in a proportioned amount to a stream of water. The stream of water carrying the foam stabilizing material will then be divided into one or more jets for aspirating air and producing the foam, as is well understood in the art. The hydrolysis products may also be added to the water simultaneously with or just subsequent to the incorporation of the air therein.

The terms and expressions which I have employed are used as terms of description and not of limitation, and I have no intention, in the use of such terms and expressions, of excluding any equivalents of the features shown and described.

Subject matter disclosed but not claimed herein is claimed in my divisional application Ser. No. 479,603, filed March 18, 1943.

I claim:

1. A foam stabilizing composition comprising an aqueous solution of hydrolysis products obtained by hydrolyzing a protein selected from the class consisting principally of keratins, albumens, globulins, hemoglobins and seed meal proteins by means of an alkaline compound selected from the class consisting of oxides and hydroxides of the alkaline earth metals and magnesium, said products containing at least 25% of their nitrogen content in the form of peptones.

2. A foam stabilizing composition prepared for making fire extinguishing air foam comprising an aqueous solution of hydrolysis products obtained by hydrolyzing a protein selected from the class consisting of keratins, albumens, globulins, hemoglobins and seed meal proteins by means of an alkaline compound selected from the class consisting of oxides and hydroxides of the alkaline earth metals and magnesium, said products containing at least 50% of their nitrogen content in the form of peptones.

3. A foam stabilizing composition comprising an aqueous solution of hydrolysis products obtained by hydrolyzing a solution of blood by means of an alkaline compound selected from the class consisting of oxides and hydroxides of alkaline earth metals and magnesium, said products containing at least 25% of their nitrogen content in the form of peptones.

4. A foam stabilizing composition comprising an aqueous solution of hydrolysis products obtained by hydrolyzing a solution of hoof meal by means of an alkaline compound selected from the class consisting of oxides and hydroxides of alkaline earth metals and magnesium, said products containing at least 25% of their nitrogen content in the form of peptones.

5. A foam stabilizing composition comprising an aqueous solution of hydrolysis products obtained by hydrolyzing a solution of horn meal by means of an alkaline compound selected from the class consisting of oxides and hydroxides of alkaline earth metals and magnesium, said products containing at least 25% of their nitrogen content in the form of peptones.

6. A method of preparing a foam stabilizing solution comprising heating a protein selected from the class consisting principally of keratins, albumens, globulins, hemoglobins and seed meal proteins in an aqueous medium with an alkaline compound selected from the class consisting of oxides and hydroxides of alkaline earth metals and magnesium to hydrolyze the protein, and arresting the hydrolysis when the products of the hydrolysis have at least 25% of their nitrogen content converted to peptones.

7. A method of preparing a foam stabilizing solution comprising heating a solution of blood with an alkaline compound selected from the class consisting of oxides and hydroxides of alkaline earth metals and magnesium to hydrolyze the protein, and arresting the hydrolysis when the products of the hydrolysis have at least 25% of their nitrogen content converted to peptones.

8. A method of preparing a foam stabilizing solution comprising heating a solution of hoof meal with an alkaline compound selected from the class consisting of oxides and hydroxides of alkaline earth metals and magnesium to hydrolyze the protein, and arresting the hydrolysis when the products of the hydrolysis have at least 25% of their nitrogen content converted to peptones.

9. A method of preparing a foam stabilizing solution comprising heating a solution of horn meal with an alkaline compound selected from the class consisting of oxides and hydroxides of alkaline earth metals and magnesium to hydrolyze the protein, and arresting the hydrolysis when the products of the hydrolysis have at least 25% of their nitrogen content converted to peptones.

10. A method of preparing a foam stabilizing solution comprising heating a protein selected from the class consisting principally of keratins, albumens, globulins, hemoglobins and seed meal proteins in an aqueous medium with an alkaline compound selected from the class consisting of oxides and hydroxides of alkaline earth metals and magnesium to hydrolyze the protein, and arresting the hydrolysis when the products of the hydrolysis have at least about 50% of their nitrogen content converted to peptones.

ARTHUR FERDINAND RATZER.